United States Patent Office 3,749,555
Patented July 31, 1973

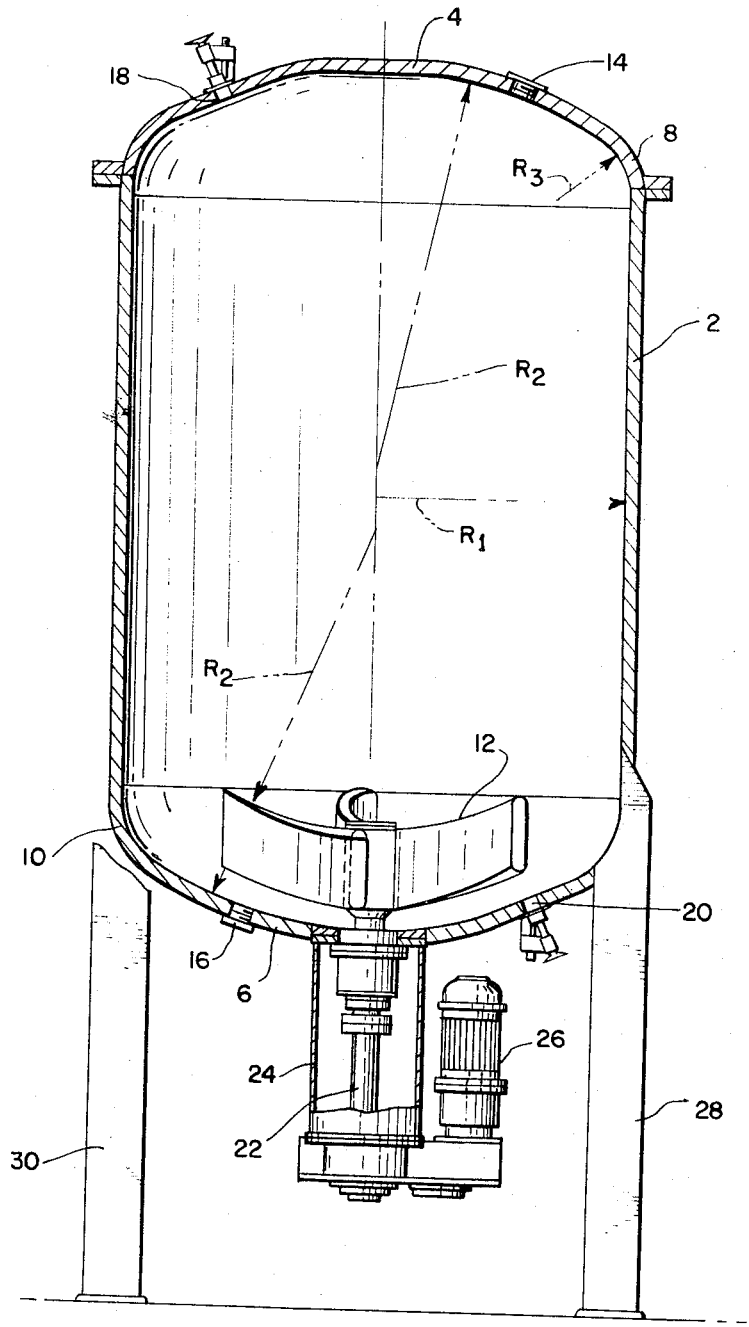

3,749,555
POLYMERIZATION REACTOR
Günter Beckmann, Johannes Dietrich, and Kurt Pfeiffer, Marl, Germany, assignors to Chemische Werke Huls Aktiengesellschaft, Marl, Germany
Continuation-in-part of abandoned application Ser. No. 13,721, Feb. 24, 1970. This application Nov. 29, 1971, Ser. No. 203,060
Claims priority, application Germany, Mar. 1, 1969, P 19 10 482.6
Int. Cl. C08f 1/98
U.S. Cl. 23—285                                   4 Claims

ABSTRACT OF THE DISCLOSURE

Agitator equipped reactors particularly useful for the suspension polymerization of 1-butene having a radius of curvature of the cylindrical internal wall surface of 1600 to 2750 mm., a radius of curvature of the bottom reactor dome of 2560 to 4200 mm., and a radius of curvature of the bottom reactor flange of 495 to 700 mm.

CROSS REFERENCES TO RELATED APPLICATIONS

The present application is a continuation-in-part of application Ser. No. 13,721, filed Feb. 24, 1970, now abandoned.

The disclosure of assignee's copending application Ser. No. 823,541, filed in the U.S. Patent Office on May 9, 1969, U.S. Pat. No. 3,640,919 is incorporated herein. Application Ser. No. 823,541 discloses the state of the art of polymerizing poly-1-butene.

BACKGROUND OF THE INVENTION

The field of the invention is tanks for chemical treatment.

The state of the art of chemical apparatus used as polymerization reactors may be ascertained by reference to U.S. Pats. 2,444,848 of Purven; 2,636,026 of Nelson; 3,206,287 of Crawford; and 3,354,136 of Crawford.

The state of the art of 1-butene and its polymerization to poly-1-butene may be ascertained by reference to Kirk-Othmer "Encyclopedia of Chemical Technology," 2nd ed., vol. 3 (1964), pages 830–865 under the section "Butylenes," particularly pages 832–833, and 846–855, and vol. 14 (1967), pages 217–313 under the section "Olefin Polymers," particularly pages 309–313. In vol. 3 of Kirk-Othmer, the nomenclature and physical properties of 1-butene are disclosed on page 832, and the polymerization reactions therefor are disclosed on page 846. Vol. 14 of Kirk-Othmer discloses at pages 309–313 the state of the art of poly-1-butene.

As known to the prior art, 1-butene is polymerized to poly-1-butene. For this purpose, a number of polymerization catalysts and conditions are suitable. In the case where the polymerization is conducted in the liquid phase, it is possible to employ a liquid, inert solvent, or the liquefied 1-butene itself, as the reaction medium.

It has proved to be especially advantageous to conduct the polymerization in the presence of Ziegler catalysts in accordance with the low pressure method. In this connection, mixed catalysts of alkyl aluminum compounds and titanium halides are used in most cases for example, diethylaluminum monochloride and titanium tetrachloride. The temperatures employed in this polymerization are between $-10°$ C. and $100°$ C., and the pressure ranges between 1 and 16 atmospheres absolute.

Poly-1-butene is a polyolefin exhibiting still further advantages over the other polyolefinic thermoplasts, polyethylene and polypropylene.

For example, the softening point of poly-1-butene of $125°$ C., according to British Standard 1493/1958, F, is relatively high and permits the use of this material for hot water pipes.

The structure of the molecular chains of a poly-1-butene obtained, for example, with titanium tetrachloride mixed catalysts is predominantly isotactic. However, during the polymerization, always there is also obtained a proportion of between 5 and 10 percent by weight of atactic structure molecule chains. The isotactic proportion of the polymer is insoluble at temperatures of below $50°$ C. in the diluents customarily employed in the polymerization process. The customary diluents are butane, pentane, hexane, heptane or 1-butene itself, and temperatures below $50°$ C. are chosen when it is desired to polymerize in suspension. In the case of polymerization reactions below $50°$ C., the polymerized product precipitates as a suspended powder directly after its formation in the diluent. This product is more or less swollen, depending on the temperature. The atactic polymerized product, simultaneously formed during the polymerization, is a wax-like, tacky substance which is soluble in the above-mentioned diluents. The isotactic powder particles likewise contain a minor proportion of atactic material which is inaccessible to the diluent in the interior of the particles. The remaining portion of the atactic polymer is dissolved in the diluent.

The suspension of the polymerized product, as produced during the polymerization, can exhibit a solids content of up to 22 percent by weight.

In the polymerization experiments, it is observed that the suspension of polymerized product exhibits properties which are extraordinarily troublesome for the commercial application of the suspension polymerization process in stirrer-equipped reaction chambers, i.e. in agitator-equipped autoclaves, and, in many cases, make an economical manufacture of poly-1-butene outright impossible. When the suspension exihibits solids contents of above 10 percent by weight, especially in the case of solid contents of 19–22 percent by weight, as they occur prior to the termination of the polymerization, there is a strong deviation of the effective suspension viscosity from the Newtonian viscosity behavior. The abnormality of the viscosity behavior is so pronounced that it is impossible to measure the viscosity by means of a viscosimeter.

The properties of the suspension can be detected by immersing a glass rod into a suspension sample containing 18 percent by weight of solids in a mixture of hexane and butene, and slowly stirring the glass rod at a peripheral speed of about 5 cm./sec. In this procedure, the entire suspended solid mass rotates like a block, there being only minor movement within the interior of the solid block. The entire amount of sliding necessary for the rotary motion takes place in a thin layer of the diluent along the wall. The solid particles seem to adhere to one another and form a composite. When the vertically immersed rod is stirred more vigorously at about 20–30 cm./sec. peripheral speed, this composite is dissolved, and the suspension moves like a viscous fluid.

If one's hand is immersed into the same suspension and the solid mass is compressed underneath the liquid level, then a lump of solid matter is formed which does not deliquesce without external use of force.

This property of the suspension makes it necessary, when polymerizing in a conventional 150 liter stirrer-equipped autoclave (height:diameter=1.5:1, twin propeller stirrer with 0.8 of container diameter), to select speeds of rotation of at least 250 r.p.m. in order to provide that the entire content of the stirrer-equipped autoclave is set into motion sufficiently for thorough mixing.

When polymerizing at this number of revolutions in a continuous process over an operating period of about 3 days, then large deposits of product are found on the internal surfaces of the autoclave. The thickest deposits are either in areas wherein the current is stagnant, for example in connecting pipe necks, or in zones where the current is strongly deflected, as is the case, for example, along strongly concave curved wall surfaces.

When the polymerization is continued in spite of the formation of such product deposits, these deposits detach themselves from the wall after several days have elapsed, and are seized by the stirrer disintegrated, and ground to a round shape by friction during the stirring operation into pebble-like forms having diameters of 1–3 cm. These polymer lumps interfere with the agitation and the discharge of the polymerization kettle, as well as with the operating steps following the polymerization, such as catalyst decomposition, washing out the catalyst residues, and drying of the powder. These lumps cause clogging in pipelines, at pump inlets, or at the connecting pipes to the apparatus.

It is impossible to continuously polymerize 1-butene by means of the conventional reactors without the occurrence of these disturbances.

SUMMARY OF THE INVENTION

Having in mind the limitations of the prior art, it is an object of the present invention to continuously polymerize 1-butene without the clogging of the apparatus.

The prior art clogging problem is solved according to the present invention by providing a polymerization reactor having a radius of curvature of the cylindrical internal wall surface of 1600 to 2750 mm., a bottom reactor dome having a radius of curvature of 2560 to 4200 mm., and a bottom reactor dome flange having a radius of curvature of 495 to 700 mm. In the preferred construction of the apparatus, the radius of curvature of the cylindrical internal surface is 2200 mm., the bottom reactor dome has a radius of curvature of 3520 mm., and the reactor dome flange has a radius of curvature of 680 mm. The bottom and top domes of the reactor are symmetrical.

The agitator for the reactor is bottom driven and in the particular embodiment is a three vane impeller having an outer diameter larger than the radius of curvature of the inside of the cylindrical shell. The critical feature of the impeller is not three vanes, but its size and diameter.

The impeller, due to its size and large diameter, is capable of setting the contents of the kettle into rotation at a particularly low number of revolutions and thereby avoiding high shear stress peaks in the suspension. The shear stress distribution in the suspension becomes more equalized and uniform in this manner as contrasted by a more rapidly rotating, smaller impeller. Thereby, the tendency toward the formation of caking at the wall of the agitator is prevented and deposits on the kettle wall directly underneath are avoided.

The single impeller used in the present invention has three vanes, each of which has a length of 1350 mm., a height of 650 mm. and a thickness of 133 mm.

BRIEF DESCRIPTION OF THE DRAWING

The invention itself, however, is understood most readily from the following more detailed description when considered in connection with the accompanying drawing, wherein:

The figure is a vertical sectional view of the chemical treatment apparatus which shows one embodiment of the invention.

In the figure the apparatus comprises a vertical, cylindrical shell or container 2 having a dome 4 at the top thereof, and a dome 6 at the bottom. The domes are connected to the cylindrical shell by curved flanges 8 and 10. The radius of curvature of the cylindrical shell is $R_1$ while the radius of curvature of the top and bottom domes is $R_2$, and the radius of curvature of the flanges is $R_3$.

The apparatus has openings 18 and 20 for insertion of raw materials and the removal of products. Plugs 14 and 16 are used to fill openings in the apparatus.

A three vane impeller 12 is located in the bottom of the apparatus and is attached to shaft 22 having a housing 24. The impeller is actuated by electric motor 26. The outer diameter of the impeller is larger than half the diameter of the cylindrical shell. $(2 \times R_1)$.

The apparatus is supported by support legs 28 and 30. The internal reactor chamber does not have any cooling installations and the unused drain pipes as well as the manholes are sealed by means of plugs 14 and 16 which fill the open spaces.

DESCRIPTION OF THE PREFERRED EMBODIMENTS

In the preferred embodiments of the present invention, having particular radii $R_1$, $R_2$ and $R_3$, the reactors contain 32 m.$^3$ and preferably 100 m.$^3$.

Such reactor sizes are generally not customary in prior art olefin polymerizations, since it was not known heretofore that a sufficient agitation effect could be attained with such large reactor sizes during the olefin polymerization. It is, therefore, surprising that it is possible, by maintaining the increased radii, to avoid almost completely the troublesome wall deposits, and simultaneously to produce a poly-1-butene having a high and homogeneous quality without lumps of polymerized product.

In accordance with a preferred embodiment, reactors are employed wherein the stirrer element of the agitator-equipped autoclave has an external diameter of at least one-half of the internal diameter of the kettle, and is driven from the bottom, for example by a three-vane impeller. The stirrer element is designed to be large as compared to the kettle and thus requires a lower speed of rotation for achieving a high agitating effect than does, for example, a high powered mixer of a smaller diameter. Since stirrer elements of such large dimensions require very high drive torques, i.e. large drive shaft diameters, for the kettle sizes under consideration, it is advantageous to dispose the stirrer element closely above the reactor bottom and to drive this element by means of a short shaft passed through the bottom reactor dome.

Furthermore, it has proved advantageous to fill the unused connecting pipe outlets as completely as possible with plugs, which plugs terminate flush with the internal wall surface so that the wall curavture is interrupted as little as possible.

Suitably, the autoclaves are distinguished by the omission of otherwise customary built-in components. Thus, the installation of vertical or helical, or conically arranged cooling coils or cooling cylinders, as they are usually found in agitated polymerization autoclaves, is disadvantageous for the 1-butene polymerization in a temperature range of between —10° C. and 50° C., preferably between 16 and 46° C. In connection with the kettle sizes under consideration, the cooling effect afforded by the kettle wall is generally insufficient by itself for removing the heat of polymerization, if it is intended to operate under economically favorable conditions, i.e., at a rapid polymerization speed and with an inexpensive cooling medium. Consequently, the use of evaporative cooling on the outside kettle walls is advantageous.

Without further elaboration, it is believed that one skilled in the art can, using the preceding description, utilize the present invention to its fullest extent.

Example

In four different agitated autoclaves having varying wall radii of curvature and varying sizes, 1-butene is continuously polymerized in a conventional manner according to the same recipe by means of the catalysts diethylaluminum monochloride and titanium tetrachloride.

As the diluent, a mixture of $C_4$ hydrocarbons is employed, which hydrocarbons are inert toward the catalysts. The $C_4$ hydrocarbons can, for example, be a so-called cracking gas fraction containing at least 50 percent by weight of 1-butene. In this gas mixture, no oxygen compounds or sulfur compounds must be contained. Also substances having triple bonds or conjugated double bonds are undesirable. The polymerization temperature is 30° C., the internal pressure is about 2 atmospheres gauge, and the average residence time is 18 hours. The dispersion leaving the polymerization chamber is mixed with methanol in order to decompose the catalyst. Thereafter, the solid matter is separated from the liquid by centrifuging, and the powder particles of solids are finally dried with warm nitrogen.

All of the stirred autoclaves have impeller agitators. The internal surfaces are of enamel in the case of the smaller autoclaves, and are polished stainless steel in the case of the large autoclaves. As known in the art, wall deposits adhere somewhat more firmly to stainless steel surfaces than to enamel surfaces, due to the smoother surface finish of the enamel, but these differences are very small as compared to the influence exerted by the wall curvature.

The following table demonstrates that, after several days of operation, wall deposits have been formed on the surfaces having wall radii of curvature of less than 1.6 mm.; that the largest stirrer autoclave exhibits, in total, the least amount of material deposited on the walls; that deposits are formed on the wall in zones of strong current deflection; and that deposits are produced in connecting pipe necks not subjected to any throughflow.

What is claimed is:

1. Material treatment apparatus having a height to diameter ratio of about 1.7 to 1 for polymerizing 1-butene at a temperature between —10° C. and 100° C. and a pressure range between 1 and 16 atmospheres to produce poly-1-butene having a solids content of above 10 percent by weight in suspension, the improvement comprising:
    (a) a cylindrical shell having a radius of curvature of the inside of the cylinder shell of about 1600 to 2750 mm.;
    (b) a bottom reactor dome having a radius of curvature of about 2560 to 4200 mm. and a top reactor dome;
    (c) bottom and top dome flanges connecting the domes to said shell, said bottom dome flanges having a radius of curvature of about 495 to 700 mm.;
    (d) means for introducing materials to and removing materials from the inside of said shell; and
    (e) means for agitating the inside of said shell comprising a single bottom-driven impeller having an outer diameter larger than said radius of curvature of the inside of the cylindrical shell.

2. Material treatment apparatus having a height to diameter ratio of about 1.7 to 1 for polymerizing 1-butene at a temperature between —10° C. and 100° C. and a pressure range between 1 and 16 atmospheres to produce poly-1-butene having a solids content of above 10 percent by weight in suspension, the improvement comprising:
    (a) a cylindrical shell having a radius of curvature of the inside of the cylinder shell of about 1600 to 2750 mm.;
    (b) a bottom reactor dome having a radius of curvature of about 2560 to 4200 mm. and a top reactor dome;
    (c) bottom and top dome flanges connecting the domes to said shell, said bottom dome flanges having a radius of curvature of about 495 to 700 mm.;
    (d) means for introducing materials to and removing materials from the inside of said shell; and
    (e) means for agitating the inside of said shell comprising a three vane impeller having an outer diameter larger than said radius of curvature of the inside of the cylindrical shell.

3. The apparatus of claim 2, wherein the radius of curvature of the cylindrical shell is about 2200 mm., the radius of curvature of the bottom dome is about 3520 mm., and the radius of curvature of the bottom dome flanges is about 680 mm.

CONTINUOUS POLYMERIZATION OF 1-BUTENE IN STIRRED AUTOCLAVES HAVING VARYING RADII OF WALL CURVATURE WITH 7 HOURS AVERAGE RESIDENCE TIME AND AN OPERATING PERIOD OF 5 DAYS

| Content, m.³ | Height: diameter | Stirred autoclaves, radii of wall curvature— | | | Type of agitator | Speed of rotation, r.p.m. | Site of wall deposits, as found after emptying the stirred autoclave | Amount of the deposited material, totaled over the entire operating period |
|---|---|---|---|---|---|---|---|---|
| | | Cyl. wall, mm. | Dome flange, mm. | Dome, mm. | | | | |
| 0.15 | 1.5:1 | 284 | 60 | ¹ 600 | Three-vane impeller. | 250 | 2 cm. thick deposit on cylindrical wall opposite the stirrer tips; up to 15 cm. thick deposits in the flanges on the domes deposits decreasing in thickness toward the center—all blind connecting pipes are clogged. Residual space filled up to ⅓ with loose lumps of product. | 5 percent of the produced polymer. |
| 8.0 | 1.66:1 | 970 | 310 | ² 1,600 | do | 120 | On cylindrical wall, patches of deposit of a thickness of 0.2 cm.—On the flow side of the current deflector finger, 8 cm. thick deposit extending up to cylindrical wall. In the flanges deposits up to 2 cm. thickness. On the domes, no deposits. All blind connecting pipes clogged. 8 kg. of loose product lumps on bottom of stirred autoclave. | 0.5 percent of the produced polymers |
| 32 | 1.68:1 | 1,600 | 495 | ² 2,560 | do | 75 | Cylindrical wall free; domes free; in the lower flange deposits of about 0.8 cm. in thickness. On the thermal probe, baked-on deposits of about 5 cm. thickness. Blind connecting pipe necks clogged by deposits. | 0.1 percent. |
| 100 | 1.7:1 | 2,200 | 680 | ² 3,520 | do | 50 | Cylindrical wall free; domes free; in the lower flange patches of 0.2 cm. thick deposits. On the thermal probe (upstream side) 3 cm. thick deposits. Blind connecting pipes were equipped with plugs; no deposits at those points. | 0 percent. |

¹ Screen bottom.  ² Cage bottom.

4. The apparatus of claim 2, having unused connecting pipe outlets filled by plugs which terminate flush with the inside surface of the apparatus.

References Cited

UNITED STATES PATENTS

| 2,444,848 | 7/1948 | Purvin | 260—94.8 |
| 2,636,026 | 4/1953 | Nelson | 260—85.3 |
| 2,854,320 | 9/1958 | Fields | 23—285 |
| 3,354,136 | 11/1967 | Crawford | 260—93.5 S |

JAMES H. TAYMAN, JR., Primary Examiner

U.S. Cl. X.R.

260—93.7, 94.9 P; 259—8, 24, 44, 107, 108; 23—290